Figure 1:
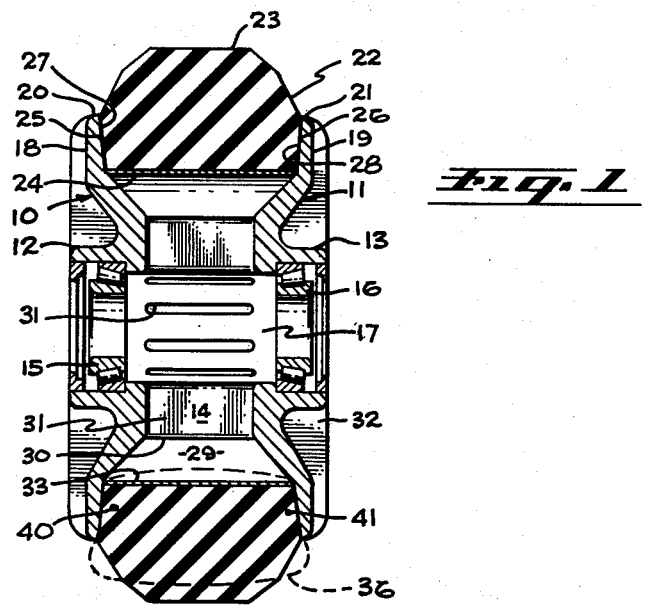

INVENTOR.
MILTON E. ROSS

United States Patent Office 3,114,408
Patented Dec. 17, 1963

3,114,408
SHEAR TREAD WHEEL
Milton E. Ross, Burbank, Calif., assignor to Aerol Co., Inc., Los Angeles, Calif., a corporation of California
Filed Sept. 26, 1961, Ser. No. 140,740
3 Claims. (Cl. 152—323)

The invention relates to wheels employing a cushioned tread and has special reference to a wheel assembly wherein a solid tire of the non-pneumatic variety is formed as an integral part of the wheel assembly in order to produce a rugged heavy-duty type of wheel suitable for transporting all variety of loads over a considerably great variety of surfaces.

The wheel assembly here under consideration is one found particularly useful in providing a rolling support for industrial vehicles and vehicles of similar character where it is important that need for maintenance be kept to a minimum.

Heretofore in recognition of the need for non-pneumatic tires on equipment of the type above made reference to, solid rubber tires have often been used. Despite the fact that a reasonable degree of resilience can be incorporated into rubber tires, experience has taught that because of the limited compressive characteristics of solid rubber, even under the best circumstances vehicles equipped with tires of this kind have not experienced a sufficient degree of freedom from jarring and vibration as the wheels have been run over a rough surface. This has been particularly true where the vehicles have been heavily loaded. In an attempt to circumvent this objection, some resort has been had to tires filled with a spongy or foamy rubber cushion designed to supply a degree of resilience without resort to a pneumatic type of tire but tires of this kind have been found relatively expensive for many commercial needs.

Where attempts have been made to mount solid tires in order to provide a more resilient riding effect, the structures made use of have been complicated to a considerable degree in some instances and in other instances have subjected the rubber-like material to an exaggerated degree of flexure and the flexure experienced in such instances has not proved satisfactory.

It is therefore among the objects of the invention to provide a new and improved wheel assembly wherein a solid rubber tire is combined with a wheel in such fashion that the tire exhibits a shear resistance to deformation when the wheel assembly is loaded and a method of making the same.

Another object of the invention is to provide a new and improved wheel assembly and method of making the same combining a solid tire with a wheel in a fashion such that the deformation experienced by the tire under loaded conditions and under operating conditions is in shear and which provides a cushioning effect under all manner of degrees of loading which is materially better than those exhibited by solid tires heretofore available.

Still another object of the invention is to provide a new and improved shear tread wheel assembly which can be fabricated and assembled under careful control, irrespective of the size of tire or diameter of the wheel assembly, and which is capable of being produced relatively inexpensively without in any way sacrificing the rugged character or cushioned effect which is the aim of the wheel assembly here under consideration.

With these and other objects in view, the invention consists in the construction, arrangement and combination of the various parts of the device, whereby the objects contemplated are attained, as hereinafter set forth, pointed out in the appended claims and illustrated in the accompanying drawings.

Figure 2:
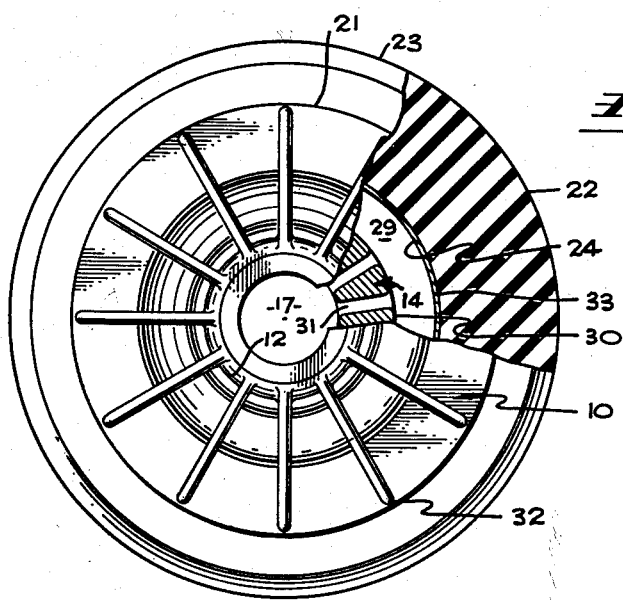

In the drawings:
FIGURE 1 is a transverse sectional view of the wheel assembly complete and ready for installation upon a vehicle.
FIGURE 2 is a side elevational view of the wheel assembly of FIGURE 1 partially broken away to show the interior construction.

In an embodiment of the invention chosen for the purpose of illustration there is shown a wheel consisting of side plates 10 and 11 having respective hub portions 12 and 13, the side plates being joined together by employment of struts 14 which in the arrangement shown may be construed as forming a core. Substantially conventional bearings 15 and 16 are mounted in the hub portions. An axial bore 17 extends through the core from end to end and is substantially in communication with the exterior through the bearing on those occasions when the wheel assembly is mounted in the customary fashion.

Outer portions 18 and 19, respectively, of the plates 10 and 11 extend oppositely in an outward direction near respective perimeters 20 and 21 in order to form a chamber therebetween within which a solid tire 22 is located. The tire has a tread surface 23 and an inner annular surface 24. Side walls 25 and 26 of the tire lie between the tread surface and the inner annular surface. These side walls are adhesively connected to respective inner surfaces 27 and 28 of the plates 10 and 11.

When the tire is in position as shown, an open space 29 remains between the inner annular surface 24 and an outer annular surface 30 of the struts 14. Passages 31 communicate between the open space 29 and the bore 17. If desired, ribs 32 may be employed to additionally strengthen the side plates.

When the wheel assembly is formed, the side plates and struts are built together as a single component. Constructed and assembled as described, the chamber previously mentioned as existing between the outer portions of the side plates and exteriorly relative to the outer annular surface 30 of the struts 14 is initially open and receptive of the tire 22. A partition 33 of expendable material such as stiff cardboard is then located at the junction of the inner surfaces 27, 28 and sloping surfaces 34 and 35 of the plates 10 and 11. The solid tire is then cast in place bottomed upon the partition 33 and is built up so as to extend well beyond the perimeters 20 and 21 of the side plates. How greatly the outer portion of the tire is built up depends upon a variety of needs and the relative amount of building up is of secondary consequence.

As the material of the tire is cast in place in the chamber heretofore identified, the rubber-like material in the tire in cooling and curing bonds firmly to the respective inner surfaces 27 and 28 and becomes firmly adhered to the side plates. In addition the form of the tire being wider than the space identified by the sloping surfaces 34 and 35, resists being impressed into the space 29.

When the wheel assembly with the tire cast in place is subjected to a loading condition, the tire will tend to be deformed somewhat as suggested by the broken line 36 in FIGURE 1. This may produce a slight bulging at the sides and a considerable degree of bulging at the inner annular surface 24 into the open space 29. There is no appreciable resistance offered by the expendable partition 33 which may be fractured and broken during initial stages of operation. Under such flexure, areas 40 and 41 are subjected to a shearing force and offer a shearing resistance to deformation. The shearing effect is most pronounced nearest the side walls of the tire where they are adhesively joined to the inner surfaces 27 and 28 of the side plates. By making use of the shear resistance of the rubber-like material, a very desirable cushioning effect is experienced and is one which offers substantially a minimum degree of wearing and fatigue of the material comprising the tire. By reason of presence of the passages 32, air in the open space 29 is not confined but is in communication with the ambient atmosphere; hence it is the shearing effect resisted by the material at the sides of the tire which produces the desired cushioned ride expected of the wheel assembly.

Moreover, by making it possible to completely construct the metal portions of the wheel initially and then by casting the tire in place the method of fabrication is one which enables the wheel assembly to be rapidly constructed and at an appreciably low cost. The assembly as described, moreover, is one such that the tire and its mounting can be made just as rugged as it might need to be to withstand all degrees of loading, both light and heavy and in a manner permitting long wear when the wheel is used over a great variety of surfaces.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A shear tread wheel comprising a hub core, side plates on the hub core spaced from each other, outer portions of said plates adjacent the perimeter being spaced radially outwardly of said hub core relative to inner portions thereof, said outer portions and an outer surface of said hub core forming a chamber, said outer portions having inside surfaces extending in a generally radially direction and spaced one from the other on opposite sides of said chamber, said core having passage means communicating between the chamber and the exterior, and a solid tire having a tread surface spaced outwardly relative to the perimeters of the side plates, an inner annular surface of said tire in said chamber being spaced radially outwardly relative to the outer surface of said hub core, and annular side wall portions of said tire spaced from each other in an axial direction and extending between said tread surface and said inner annular surface, said side wall portions being anchored respectively in adhesive engagement with adjacent inside surfaces of said plates whereby a load impressed upon the tread surface of the tire is transferred to the side plates by shear in the tire adjacent said side walls.

2. A shear tread wheel comprising a hub, side plates on the hub spaced from each other, a core at inner portions of said plates adjacent the hub connecting said plates together, outer portions of said plates adjacent the perimeter and radially outwardly of said core having axially spaced inside surfaces spaced wider apart than said inner portions, said outer portions and an outer surface of said core forming a chamber, said core having an axial bore therein and having passageway communicating between said chamber and said bore, and a solid tire of homogeneous yieldable material having a tread surface spaced outwardly relative to the perimeters of the side plates, an inner annular surface of the tire in said chamber spaced radially outwardly relative to the outer surface of said core and substantially parallel annular side wall portions on axially opposite sides of said inner and outer surfaces and extending between said tread surface and said inner annular surface, said inner surface comprising an unsupported bridge between said side walls being anchored in adhesive engagement with adjacent inside surfaces of said plates whereby a load impressed upon the tread surface of the tire is transferred to the side plates by shear in the tire adjacent said side walls.

3. A shear tread wheel comprising a hub, side plates on the hub spaced from each other, a core at inner portions of said plates adjacent the hub connecting said plates together, outer portions of said plates adjacent the perimeter and radially outwardly of said core having axially spaced substantially parallel inside surfaces spaced wider apart than said inner portions, each said plate having a shoulder at the junction of said inner and outer portions, said outer portions and an outer surface of said core forming a chamber, said core having an axial bore therein and having passageways communicating between said chamber and said bore, and a solid tire of homogeneous yieldable material having a tread surface spaced outwardly relative to the perimeters of the side plates, an inner annular surface of the tire in said chamber spaced radially outwardly relative to the outer surface of said core and leaving axially opposite edges thereof resting respectively on said shoulders and being unsupported therebetween, annular side wall portions between said tread surface and said said inner annular surface, said side wall portions being anchored in adhesive engagement with adjacent inside surfaces of said plates whereby a load impressed upon the tread surface of the tire is transferred to the side plates by shear in the tire adjacent said side walls.

References Cited in the file of this patent

UNITED STATES PATENTS

| 1,502,027 | Fowler | July 22, 1924 |
| 1,806,857 | Liebau | May 26, 1931 |
| 2,087,365 | Weisemann | July 20, 1937 |
| 2,525,196 | Bacon | Oct. 10, 1950 |
| 2,764,213 | Simpson | Sept. 25, 1956 |

FOREIGN PATENTS

| 346,476 | Great Britain | Apr. 16, 1931 |